United States Patent
Sun et al.

(10) Patent No.: US 9,674,159 B2
(45) Date of Patent: Jun. 6, 2017

(54) EXTENDING DATA OVER CABLE SERVICE INTERFACE SPECIFICATION (DOCSIS) PROVISIONING OF ETHERNET PASSIVE OPTICAL NETWORK (EPON) (DPOE) TO EPON OVER COAX (EPOC) MULTICAST KEY MANAGEMENT

(71) Applicant: Futurewei Technologies, Inc., Plano, TX (US)

(72) Inventors: Yanbin Sun, Shenzhen (CN); Guangsheng Wu, Shenzhen (CN); Li Zhang, Shenzhen (CN); Fanglin Sun, Shenzhen (CN); Jim Chen, Corona, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/962,683

(22) Filed: Dec. 8, 2015

(65) Prior Publication Data
US 2016/0105404 A1    Apr. 14, 2016

Related U.S. Application Data

(62) Division of application No. 14/298,513, filed on Jun. 6, 2014, now Pat. No. 9,240,983.
(Continued)

(51) Int. Cl.
*H04L 29/06* (2006.01)
*H04L 9/08* (2006.01)
(Continued)

(52) U.S. Cl.
CPC ........ *H04L 63/0428* (2013.01); *H04L 9/0819* (2013.01); *H04L 9/0833* (2013.01);
(Continued)

(58) Field of Classification Search
CPC ...................................................... H04L 63/65
(Continued)

(56) References Cited

U.S. PATENT DOCUMENTS

| 5,748,736 A | 5/1998 | Mittra |
| 8,503,447 B2* | 8/2013 | Lee ......................... H04H 60/73 370/390 |

(Continued)

FOREIGN PATENT DOCUMENTS

| EP | 2439871 A1 | 4/2012 |
| WO | 03036908 A1 | 5/2003 |
| WO | 2004030294 A1 | 4/2004 |

OTHER PUBLICATIONS

"Part 3: Carrier Sense Multiple Access with Collision Detection (CSMA/CD) access method and physical layer specification," 802.3ah, 2005, 417 pages.
"Draft Standard for a Precision Clock Synchronization Protocol for Networked Measurement and Control Systems," IEEE P1588 D2.2, 2007, 305 pages.
(Continued)

*Primary Examiner* — Jacob Lipman
(74) *Attorney, Agent, or Firm* — Conley Rose, P.C.

(57) ABSTRACT

Disclosed herein are mechanisms to support the management of multicast keys for a multicast group comprising one or more optical line terminals (OLTs), one or more fiber to coax units (FCUs), and a plurality of coax network units (CNUs). The disclosed embodiments may support the management of multicast keys over optical and coaxial networks. In some embodiments, an FCU may facilitate communication of operations, administration and maintenance (OAM) messages containing multicast keys from one or more OLTs to one or more CNUs (typically a plurality of CNUs). Some embodiments may employ one multicast key over both the optical network and coaxial network. Other embodiments may employ an optical domain multicast key over the optical network and an electrical domain multicast key over the coaxial network. Embodiments may comprise
(Continued)

adding a first CNU to a multicast group as well as adding subsequent CNUs to the multicast group.

14 Claims, 6 Drawing Sheets

Related U.S. Application Data

(60) Provisional application No. 61/832,600, filed on Jun. 7, 2013.

(51) Int. Cl.
*H04L 12/18* (2006.01)
*H04Q 11/00* (2006.01)

(52) U.S. Cl.
CPC ............ *H04L 9/0891* (2013.01); *H04L 12/18* (2013.01); *H04L 63/065* (2013.01); *H04Q 11/0067* (2013.01); *H04L 2463/062* (2013.01); *H04Q 2011/0047* (2013.01); *H04Q 2011/0079* (2013.01)

(58) Field of Classification Search
USPC ........................................ 713/163
See application file for complete search history.

(56) References Cited

U.S. PATENT DOCUMENTS

| | | |
|---|---|---|
| 2003/0046539 A1 | 3/2003 | Negawa |
| 2013/0142513 A1 | 6/2013 | Chen et al. |

OTHER PUBLICATIONS

"Part 3: Carrier Sense Multiple Access with Collision Detection (CSMA/CD) Access Method and Physical Layer Specifications," IEEE P802.3av, D2.2, Dec. 3, 2008, 267 pages.
Moyer, M., et al., "A Survey of Security Issues in Multicast Communications," IEEE Network, Nov./Dec. 1999, pp. 12-23.
Huang, J., et al., "Mykil: A Highly Scalable Key Distribution Protocol for Large Group Multicast," Globcom, 2003, pp. 1476-1480.
"DPoE Security and Certificate Specification," DPoE-SP-SECv2.0-I03-140327, Cable Data Services, Mar. 27, 2014, 91 pages.
Adams, A., et al., "Protocol Independent Multicast—Dense Mode (PIM-DM) Protocol Specification (Revised)," RFC 3973, Jan. 2005, 61 pages.
Fenner, B., et al., "Protocol Independent Multicast—Sparse Mode (PIM-SM): Protocol Specification (Revised)," RFC 4601, Aug. 2006, 112 pages.
Holbrook, H., et al., "Using Internet Group Management Protocol Version 3 (IGMPv3) and Multicast Listener Discovery Protocol Version 2 (MLDv2) for Source-Specific Multicast," RFC 4604, Aug. 2006, 11 pages.
Foreign Communication From a Counterpart Application, PCT Application No. PCT/CN2014/041360, International Search Report dated Nov. 17, 2014, 6 pages.
Foreign Communication From a Counterpart Application, PCT Application No. PCT/CN2014/041360, Written Opinion dated Nov. 17, 2014, 8 pages.
Notice of Allowance dated Sep. 9, 2015, 11 pages, U.S. Appl. No. 14/298,513, filed Jun. 6, 2014.
Office Action dated Jul. 1, 2015, 6 pages, U.S. Appl. No. 14/298,513, filed Jun. 6, 2014.

\* cited by examiner

EXTENDING DATA OVER CABLE SERVICE INTERFACE SPECIFICATION (DOCSIS) PROVISIONING OF ETHERNET PASSIVE OPTICAL NETWORK (EPON) (DPOE) TO EPON OVER COAX (EPOC) MULTICAST KEY MANAGEMENT

CROSS-REFERENCE TO RELATED APPLICATIONS

The present application is a divisional application of U.S. patent application Ser. No. 14/298,513, filed Jun. 6, 2014, and entitled "Extending Data Over Cable Service Interface Specification (DOCSIS) Provisioning of Ethernet Passive Optical Network (EPON) (DPoE) to EPON Over Coax (EPoC) Multicast Key Management," which claims priority to U.S. Provisional Patent Application No. 61/832,600 filed Jun. 7, 2013 by Yanbin Sun, et al. and entitled "Method and Mechanism of Extending Data Over Cable Service Interface Specification (DOCSIS) Provisioning of Ethernet Passive Optical Network (EPON) to EPON Over Coax (EPoC) (DPoE) Multicast Key Management to EPoC," both of which are incorporated herein by reference as if reproduced in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Multicast traffic may be becoming increasingly important for many Internet applications, where an information provider (e.g. source) may deliver information to multiple recipients simultaneously in a single transmission. Some examples of multicast delivery may include video streaming, real-time internet television, teleconferencing, and/or video conferencing. Multicasting may achieve bandwidth efficiency by allowing a source to send a packet of multicast information in a network regardless of the number of recipients. The multicast data packet may be replicated as required by other network elements (e.g. routers) in the network to allow an arbitrary number of recipients to receive the multicast data packet. For example, the multicast data packet may be sent through a network over an acyclic distribution tree. As such, the multicast data packet may be transmitted once on each branch in the distribution tree until reaching a fork point (e.g. with multiple receiving branches) or a last hop (e.g. connecting to multiple recipients). Then, the network element at the fork point or the last hop may replicate the multicast data packet such that each receiving branch or each recipient may receive a copy of the multicast data packet.

SUMMARY

In one embodiment, the disclosure includes a method implemented by a fiber to coax unit (FCU) for establishing security over a multicast group comprising receiving an encrypted FCU operations, administration and maintenance (OAM) message containing a multicast key from an optical line terminal (OLT) via an optical network, receiving an encrypted CNU OAM message containing the multicast key from the OLT, relaying the encrypted CNU OAM message to a coax network unit (CNU) via a coaxial network, and employing the multicast key for decrypting multicast data received from the OLT via the optical network and encrypting multicast data transmitted to the CNU via the coaxial network.

In another embodiment, the disclosure includes a FCU comprising a transmitter; a receiver; and a processor coupled to the transmitter and the receiver and configured to cause the FCU to receive an encrypted CNU OAM message containing an electrical domain multicast key from an OLT via an optical network, wherein the OAM message is addressed to a CNU; decrypt the encrypted CNU OAM message to read and store the electrical domain multicast key; encrypt the OAM message with a CNU unicast key; send the encrypted CNU OAM message to the CNU via a coaxial network; receive an acknowledgment OAM message from the CNU; snoop the acknowledgment OAM message to read and store acknowledgment OAM message information; relay the acknowledgment OAM message from the CNU to the OLT; and employ the electrical domain multicast key to encrypt multicast data transmitted to the CNU via the coaxial network.

In yet another embodiment, the disclosure includes an OLT comprising a processor; a transmitter coupled to the processor configured to send a first encrypted FCU OAM message containing an optical domain multicast key to a FCU via an optical network, wherein the optical domain multicast key is associated with encryption in an optical domain associated with the optical network; send a second encrypted FCU OAM message containing an electrical domain multicast key to the FCU; and send an encrypted CNU OAM message containing the electrical domain multicast key to a CNU via the FCU and a coaxial network, wherein the electrical domain multicast key is associated with encryption in an electrical domain associated with the coaxial network.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
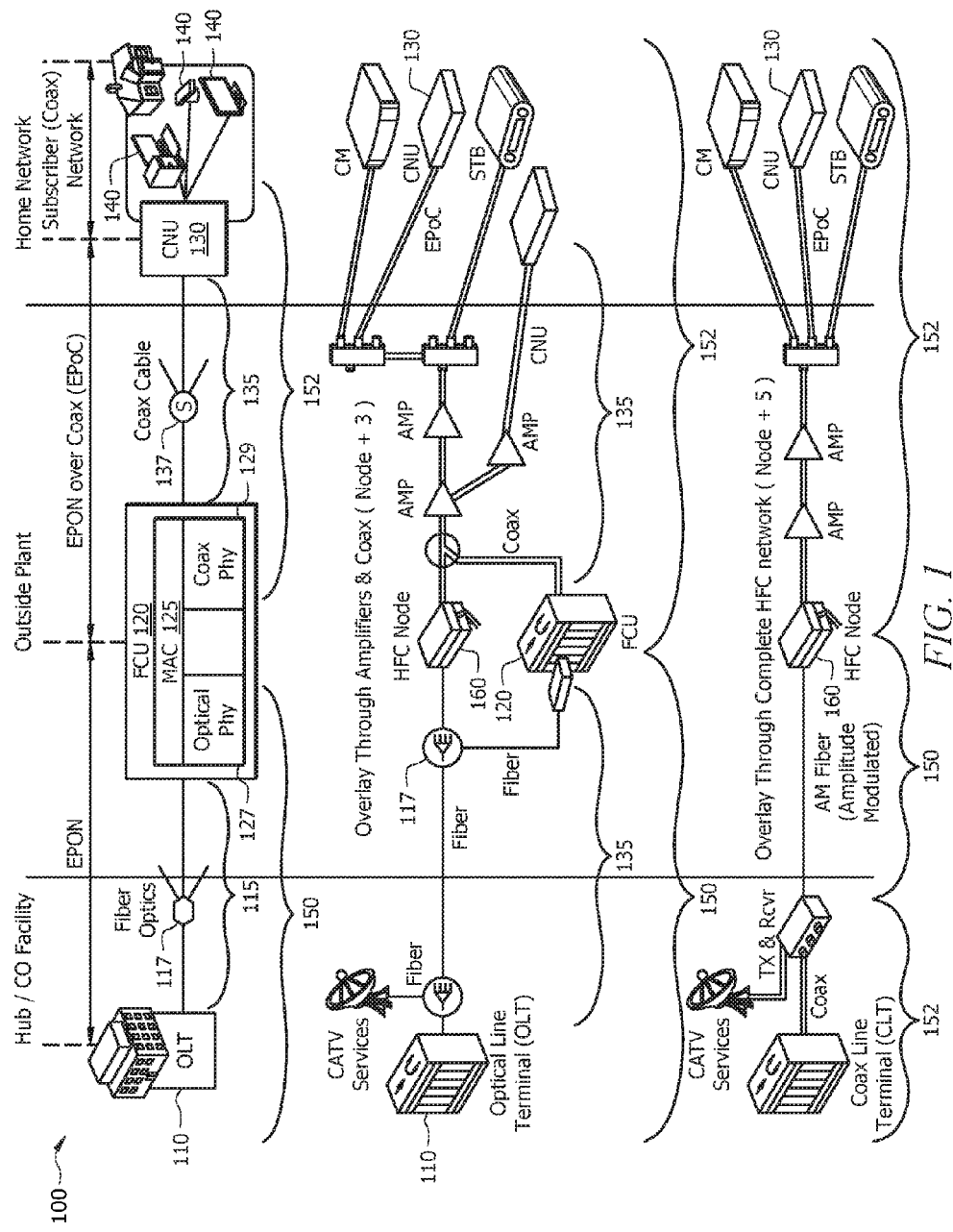
FIG. 1 is a schematic diagram of an embodiment of a unified optical-coaxial network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A passive optical network (PON) is one system for providing network access for multicasting. PON may be a point-to-multipoint (P2MP) network with passive splitters positioned in an optical distribution network (ODN) to enable a single feeding fiber from a central office to serve multiple customer premises. PON may employ different wavelengths for upstream and downstream transmissions. Ethernet passive optical network (EPON) is a PON standard developed by the Institute of Electrical and Electronics Engineers (IEEE) and specified in IEEE documents 802.3ah and 802.3av, both of which are incorporated herein by reference. EPON may be employed as an access system to interconnect with multiple coaxial cables in an Ethernet PON over Coaxial (EPoC) architecture to support access by Customer Premises Equipment (CPEs) located in the subscribers' homes. In an EPON or an EPoC network, downstream traffic may be broadcast to customer premises, while upstream bandwidths may be shared among multiple customer premises.

A PON may be a point-to-multipoint (P2MP) network comprising an OLT at a central office, an optical distribution network (ODN), and a plurality of optical network units (ONUs) at customer premises. The OLT may implement an EPON Media Access Control (MAC) layer for transmission of Ethernet frames. Multipoint Control Protocol (MPCP) may be employed to perform bandwidth assignment, bandwidth polling, auto-discovery, and ranging. Ethernet frames may be broadcast downstream based on a Logical Link Identifier (LLID) embedded in a preamble frame. Upstream bandwidth may be assigned based on an exchange of Gate and Report messages between an OLT and an ONU. A clock synchronization protocol such as IEEE (Institute of Electrical and Electronics Engineers) document 1588, which is incorporated by reference, may be used to synchronize clocks throughout a network. Alternatively, MPCP messages may be time stamped and used for clock synchronization between an OLT and ONUs.

Ethernet over Coaxial (EoC) may describe any technology which can be used for transmission of Ethernet frames over a coaxial network. Other than Data Over Cable Service Interface Specification (DOCSIS), all EoC technologies transmit Ethernet Frames in the MAC layer. EoC technologies may include, for example, Multimedia over Coax Alliance (MoCA), Home Grid (G.hn), Home Phoneline Networking Alliance (HPNA), and Home Plug Audio/Visual (A/V). EoC has been adapted to run outdoor coax access from an ONU to an EoC head end connected to CPEs located in subscribers' homes.

An EPoC system may be a hybrid access network employing both optical and coaxial technologies. The EPoC may comprise two segments: an optical segment that may comprise a PON, and a coaxial segment that may comprise a coaxial cable network. In the PON segment, an OLT may be positioned in a local exchange or central office where the OLT may connect the EPoC access network to an Internet Protocol (IP), Synchronous Optical Network (SONET), and/or Asynchronous Transfer Mode (ATM) backbone. In the coaxial segment, CNUs may be positioned at end-user locations, and each CNU may serve a plurality (e.g. three to four) of end users which may be known as subscribers. A FCU may merge the interface between the PON segment and the coaxial segment of the network. The FCU may be a single box unit that may be located where an ONU and a Coaxial Line Terminal (CLT) are fused together, for example, at a curb or at a basement of an apartment building.

Disclosed herein are mechanisms to support the management of multicast keys for a multicast group comprising one or more OLTs, one or more FCUs, and a plurality of CNUs. The disclosed embodiments may support the management of multicast keys over optical and coaxial networks. In some embodiments, an FCU may facilitate communication of OAM messages containing multicast keys from one or more OLTs to one or more CNUs (typically a plurality of CNUs). Some embodiments may employ one multicast key over both the optical network and coaxial network. Other embodiments may employ an optical domain multicast key over the optical network and an electrical domain multicast key over the coaxial network. Embodiments may comprise multicast key management when adding a first CNU to a multicast group as well as multicast key management when adding subsequent CNUs to the multicast group.

It should be noted that in the present disclosure, the terms FCU, Coaxial Media Converter (CMC), Optical Coaxial Converted Unit (OCU) and CLT may be equivalent and may be used interchangeably.

FIG. 1 illustrates an embodiment of a unified optical-coaxial network 100 comprising an optical portion 150 and a coaxial (electrical) portion 152. The unified optical-coaxial network 100 may include an OLT 110, at least one CNU 130 coupled to a plurality of subscriber devices 140, and a FCU 120 positioned between the OLT 110 and the CNU 130, e.g., between the optical portion 150 and the coaxial portion 152. The OLT 110 may be coupled via an ODN 115 to the FCUs 120, and optionally to one or more ONUs, or one or more Hybrid Fiber Coaxial (HFC) nodes 160 in the optical portion 150. The ODN 115 may comprise fiber optics and an optical splitter 117 and/or a cascade of 1×M passive optical splitters that couple OLT 110 to the FCU 120 and any ONUs. The value of M in EPoC, e.g., the number of FCUs, may for example be 4, 8, 16, or other values and may be selected by the operator depending on factors such as optical power budget. The FCU 120 may be coupled to the CNUs 130 via an electrical distribution network (EDN) 135, which may comprise a cable splitter 137, a cascade of taps/splitters, and/or one or more amplifiers. Each OLT 110 port may serve 32, 64, 128 or 256 CNUs 130. It should be noted that the upstream transmissions from CNUs may only reach the FCU 120 and not the other CNUs 130 due to a directional property of the tap. The distances between the OLT 110 and the ONUs and/or FCUs 120 may range from about 10 to about 20 kilometers, and the distances between the FCU 120 and CNUs 130 may range from about 100 to about 500 meters. The unified optical-coaxial network 100 may comprise any number of HFCs 160, FCUs 120 and corresponding CNUs 130. The components of unified optical-coaxial network 100 may be arranged as shown in FIG. 1 or any other suitable arrangement.

The optical portion 150 of the unified optical-coaxial network 100 may be similar to a PON in that the optical portion 150 may be a communications network that does not require active components to distribute data between the OLT 110 and the FCU 120. Instead, the optical portion 150 may use the passive optical components in the ODN 115 to distribute data between the OLT 110 and the FCU 120. Examples of suitable protocols that may be implemented in the optical portion 150 may include asynchronous transfer mode PON (APON) or broadband PON (BPON) defined by the International Telecommunication Union (ITU) Telecommunication Standardization Sector (ITU-T) document G.983, Gigabit PON (GPON) defined by the ITU-T document G.984, the EPON defined by the IEEE documents 802.3ah and 802.3av, all of which are incorporated by reference as if reproduced in their entirety, the wavelength division multiplexing (WDM) PON (WDM-PON), and the Next Generation EPON (NGEPON) in development by IEEE.

The OLT 110 may be any device configured to communicate with the CNUs 130 via the FCU 120. The OLT 110 may act as an intermediary between the FCUs 120 and/or CNUs 130 and another backbone network (e.g. the Internet). The OLT 110 may forward data received from a backbone network to the FCUs 120 and/or CNUs 130 and forward data received from the FCUs 120 or CNUs 130 onto the backbone network. Although the specific configuration of the OLT 110 may vary depending on the type of optical protocol implemented in the optical portion 150, in an embodiment, OLT 110 may comprise an optical transmitter and an optical receiver. When the backbone network employs a network protocol that is different from the protocol used in the optical portion 150, OLT 110 may comprise a converter that may convert the backbone network protocol into the protocol of the optical portion 150. The OLT converter may also convert the optical portion 150 protocol into the backbone network protocol.

The ODN 115 may be a data distribution system that may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the FCU 120. It should be noted that the optical fiber cables may be replaced by any optical transmission media in some embodiments. In some embodiments, the ODN 115 may comprise one or more optical amplifiers. In some embodiments, data distributed across the ODN may be combined with cable television (CATV) services using multiplexing schemes. The ODN 115 may extend from the OLT 110 to the FCU 120 and any optional ONUs in a branching configuration as shown in FIG. 1, but may be alternatively configured as determined by a person of ordinary skill in the art.

The FCU 120 may be any device or component configured to forward downstream data from the OLT 110 to the corresponding CNUs 130 and forward upstream data from the CNUs 130 to the OLT 110. The FCU 120 may convert the downstream and upstream data appropriately to transfer the data between the optical portion 150 and the coaxial portion 152. The data transferred over the ODN 115 may be transmitted and/or received in the form of optical signals, and the data transferred over the EDN 135 may be transmitted and/or received in the form of electrical signals that may have the same or different logical structure as compared with the optical signals. As such, the FCU 120 may encapsulate or frame the data in the optical portion 150 and the coaxial portion 152 differently. In an embodiment, the FCU 120 may include a MAC layer 125 and physical (PHY) layers, corresponding to the type of signals carried over the respective media. The MAC layer 125 may provide addressing and channel access control services to the PHY layers. As such, the PHY may comprise an optical PHY 127 and a coaxial PHY 129. In many embodiments, the FCU 120 may be transparent to the CNU 130 and OLT 110 in that the frames sent from the OLT 110 to the CNU 130 may be directly addressed to the CNU 130 (e.g. in the destination address), and vice-versa. As such, the FCU 120 may intermediate between network portions, namely an optical portion 150 and a coaxial portion 152 in the example of FIG. 1. An identifier may be associated with each FCU 120, and the identifier may uniquely identify each FCU 120.

The electrical (coaxial) portion 152 of the unified optical and coaxial network 100 may be similar to any known electrical communication system. The electrical portion 152 may not require any active components to distribute data between the FCU 120 and the CNU 130. Instead, the electrical portion 152 may use the passive electrical components in the electrical portion 152 to distribute data between the FCU 120 and the CNUs 130. Alternatively, the electrical portion 152 may use some active components, such as amplifiers. Examples of suitable protocols that may be implemented in the electrical portion 152 include MoCA, G.hn, HPNA, and Home Plug A/V.

The EDN 135 may be a data distribution system that may comprise electrical cables (e.g. coaxial cables, twisted wires, etc.), couplers, splitters, distributors, and/or other equipment. In an embodiment, the electrical cables, couplers, splitters, distributors, and/or other equipment may be passive electrical components. Specifically, the electrical cables, couplers, splitters, distributors, and/or other equipment may be components that do not require any power to distribute data signals between the FCU 120 and the CNU 130. It should be noted that the electrical cables may be replaced by any electrical transmission media in some embodiments. In some embodiments, the EDN 135 may comprise one or more electrical amplifiers. The EDN 135 may extend from the FCU 120 to the CNU 130 in a branching configuration as shown in FIG. 1, but may be alternatively configured as determined by a person of ordinary skill in the art.

In an embodiment, the CNUs 130 may be any devices that are configured to communicate with the OLT 110, the FCU 120, and any subscriber devices 140. The CNUs 130 may act as intermediaries between the FCU 120 and the subscriber devices 140. For instance, the CNUs 130 may forward data received from the FCU 120 to the subscriber devices 140, and may forward data received from the subscriber devices 140 toward the OLT 110. Although the specific configuration of the CNUs 130 may vary depending on the type of unified optical-coaxial network 100, in an embodiment, the CNUs 130 may comprise an electrical transmitter configured to send electrical signals to the FCU 120 and an electrical receiver configured to receive electrical signals from the FCU 120. Additionally, the CNUs 130 may comprise a converter that may convert FCU 120 electrical signals into electrical signals for the subscriber devices 140, such as signals in IEEE 802.11 wireless local area network (Wi-Fi) protocol. The CNUs 130 may further comprise a second transmitter and/or receiver that may send and/or receive the converted electrical signals to the subscriber devices 140. In some embodiments, CNUs 130 and coaxial network terminals (CNTs) are similar, and thus the terms are used interchangeably herein. The CNUs 130 may be typically located at distributed locations, such as the customer premises, but may be located at other locations as well.

The subscriber devices 140 may be any devices configured to interface with a user or a user device. For example, the subscribed devices 140 may include desktop computers, laptop computers, tablets, mobile telephones, residential gateways, televisions, set-top boxes, and similar devices.

In some embodiments, the elements described in FIG. 1 may be employed in a multicast network, wherein an information provider (e.g. source) may deliver information to multiple recipients simultaneously in a single transmission. In some embodiments, the source may be an OLT 110 as described in FIG. 1, wherein information may be delivered to a plurality of CNUs 130. To ensure the security of the multicast information delivery to a plurality of recipients, multicast security may be employed over the network 100, wherein the security may comprise communicating multicast key(s) to the plurality of recipients as well as any intermediate elements, such as FCUs 120.

Figure 2:
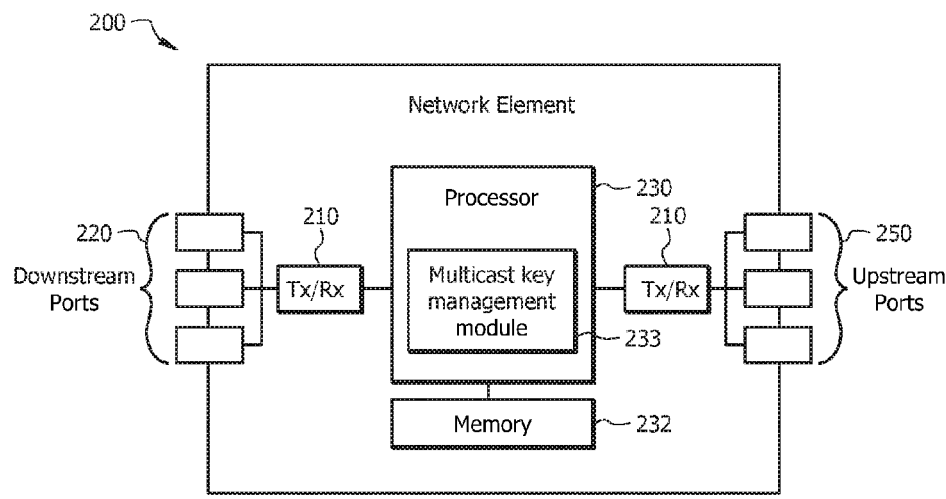
FIG. 2 is a schematic diagram of an embodiment of a network element (NE), which may act as a node in a unified optical-coaxial network.

FIG. 2 is a schematic diagram of an embodiment of a Network Element (NE) 200, which may act as an OLT 110, a FCU 120, or a CNU 130 by implementing any of the schemes described herein. In some embodiments NE 200 may also act as other node(s) in the network. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented in a network apparatus or component such as a NE 200. For instance, the features/methods in the disclosure may be implemented using hardware, firmware, and/or software installed to run on hardware. As shown in FIG. 2, the NE 200 may comprise transceivers (Tx/Rx) 210, which may be transmitters, receivers, or combinations thereof A Tx/Rx 210 may be coupled to plurality of downstream ports 220 for transmitting and/or receiving frames from other nodes and a Tx/Rx 210 may be coupled to plurality of upstream ports 250 for transmitting and/or receiving frames from other nodes, respectively. A processor 230 may be coupled to the Tx/Rx 210 to process the frames and/or determine which nodes to send the frames to. The processor 230 may comprise one or more multi-core processors and/or memory devices 232, which may function as data stores, buffers, etc. The processor 230 may be implemented as a general processor or may be part of one or more application specific integrated circuits (ASICs) and/or digital signal processors (DSPs). The processor 230 may comprise a multicast key management module 233, which may implement any of the multicast key management methods 400, 500, 600, 700, 800, 900, and 1000 at an OLT, an FCU, and/or a CNU. In an alternative embodiment, the multicast key management module 233 may be implemented as instructions stored in the memory devices 232, which may be executed by the processor 230. The memory module 232 may comprise a cache for temporarily storing content, e.g., a Random Access Memory (RAM). Additionally, the memory module 232 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 200, at least one of the processor 230 and/or memory 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
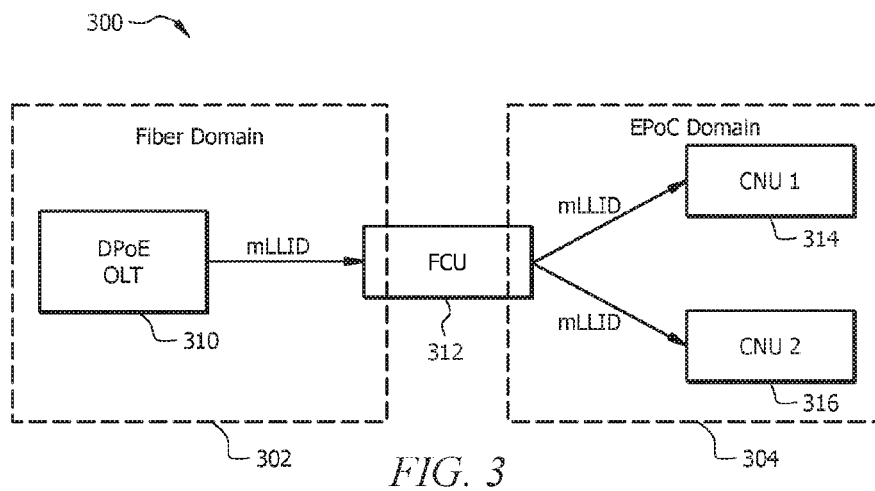
FIG. 3 is a diagram of a network comprising a fiber domain and an EPoC domain.

FIG. 3 illustrates a schematic embodiment of a DPoE system 300. The DPoE system 300 may comprise a fiber domain 302 and an EPoC domain 304. The DPoE system 300 may comprise multicast security, wherein the disclosed embodiments extend the multicast key management mechanisms from OLTs and ONUs to DPoE OLTs 310 and EPoC CNUs 314 and 316 through an EPoC FCU 312. In the embodiment of FIG. 3, the communication between the OLT 310 and the FCU 312 may be over a fiber domain 302, and the communication between the FCU 312 and the CNU(s) 314 and 316 may be over an EPoC domain 304. In other words, the FCU may provide seamless communication between the fiber domain 302 and the EPoC domain 304, which may be employed when communicating multicast security keys between the OLT 310 and CNUs 314 and 316. While the embodiment of FIG. 3 depicts only four components for purposes of clarity, the DPoE system 300 may comprise any number of OLTs 310, FCUs 312 and CNUs 314 and 316. In some embodiments, the OLTs 310, FCUs 312, and CNUs 314 and 316 may be similar to those described in FIGS. 1 and 2.

In order to preserve the security of the multicast key(s), the DPoE system 300 may send the key through the OAM messages on a previously registered and encrypted unicast LLID. The disclosed embodiments extend the multicast key management mechanisms from EPON to EPoC networks, for situations where a CNU is the first one to join a multicast group or where second or more CNUs to join an existing multicast group. One or more FCUs 312 and CNUs 314 and 316 may listen to a Multicast LLID (mLLID), and all FCUs and CNUs with the mLLID may employ the same multicast key. The multicast key may be generated by the OLT 310 and then transferred to the FCU 312 and CNU(s) 314 and 316 (e.g. via OAM messages). The FCU 312 and/or CNUs 314 and 316 may employ the multicast key(s) for encryption and/or decryption of multicast traffic.

Figure 4:
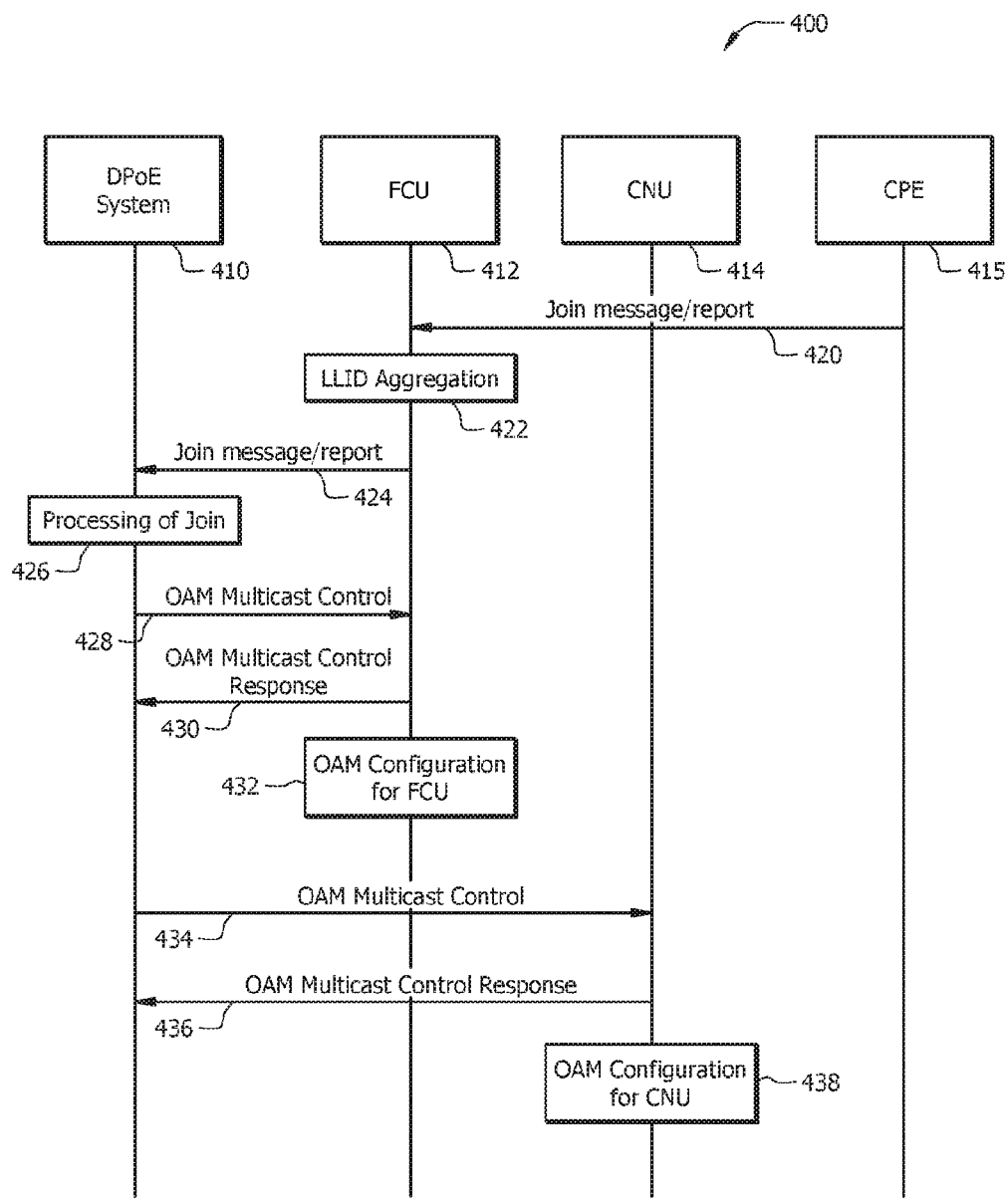
FIG. 4 is a diagram of a multicast group join method.

Before multicast keys are exchanged, a CNU may request to join a multicast group. FIG. 4 illustrates a multicast group join method 400. Method 400 may be employed by a DPoE system 410, an FCU 412, a CNU 414, and a CPE 415, which may be substantially similar to DPoE OLT 310, FCU 312, CNUs 314 and 316, and subscriber devices 140, respectively. In some embodiments, a CPE 415 associated with the CNU 414 may initiate a join message or report for a multicast group managed by the DPoE system 410 at step 420. The join message may be received by the FCU 412 connected to the CNU 414 and may be communicated via any multicast protocol, including Internet Group Management Protocol (IGMP), Protocol Independent Multicast (PIM), Multicast Listener Discover (MLD), etc., as discussed in Internet Engineering Task Force (IETF) documents Request For Comments (RFC) 3973, RFC 4601, and RFC 4604, all of which are incorporated by reference. At step 422, identifiers (e.g. LLIDs) for the CNUs joining the multicast channel (e.g. CNU 414) may be aggregated by the FCU 412 from the join message. The FCU 412 may then send the join message to the DPoE system 410 at step 424. The DPoE system 410 may processes the join message at step 426, which may comprise performing authorization of (S, G) and/or (S, C), where S denotes a multicast source, G denotes a group of multicast receivers, and C denotes a multicast channel and/or path between S and G, performing Quality of Service (QoS) authorization based on multicast serving group configuration, determining Centralized Minimum Interference Multicast (CMIM) of (S, C) associated with the join message, classifying a multicast transmission to a Group Service Flow (GSF) based on (S, G), determining an mLLID for the channel/transmission, and/or configuring the CNU and FCU for the multicast session via an OAM message. At step 428, the multicast control OAM generated by the DPoE system 410 may be communicated to the FCU 412. At step 430, the FCU 412 may send a response to the DPoE system 410 (e.g. an acknowledgment). At step 432, the FCU 412 may be configured for the multicast group based on the contents of the OAM message. At step 434, a multicast control OAM may also be communicated to the CNU 414. At step 436, the CNU 414 may send a response to the DPoE system 410 (e.g. an acknowledgment). Then, at step 438, the CNU 414 may be configured for the multicast group based on the contents of the OAM message.

Figure 5:
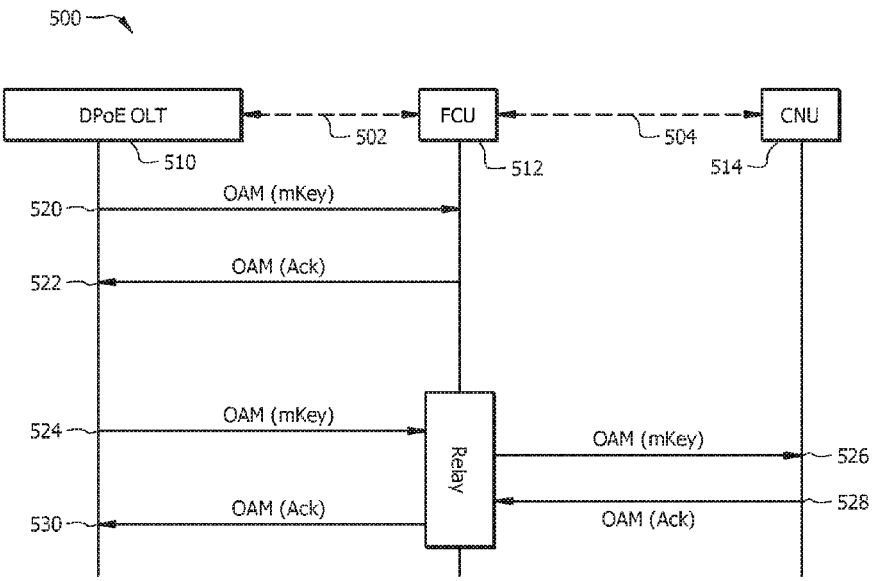
FIG. 5 is a diagram of an exemplary embodiment of a method of multicast key management for the first CNU in a multicast group.

FIG. 5 illustrates an exemplary embodiment of a method 500 of managing the exchange of multicast key(s) for a first CNU to join a multicast group, and establishing security over the multicast group. In some embodiments, the DPoE OLT 510, FCU 512, and CNU 514 of FIG. 5 may be similar to those described in FIGS. 1, 2, and 3. In the embodiment of method 500, the FCU 512 may be configured in a bridge mode and may act as a proxy by generating key(s) and/or maintaining separate security domains in the optical network and the electrical network. When operating as a bridge, the FCU 512 may perform routing functions, data alterations, security functions, etc. For example, an FCU 512 in bridge mode may maintain separate security domains between the ODN 502 and the EDN 504. The FCU 512 may also act as a proxy, a relay, etc., and may perform security authentication, security key generation, message encryption, message decryption, and/or other security or routing functions as discussed more fully herein below. The bridged FCU 512 may maintain responsibility for encrypting/decrypting messages across the electrical domain and the DPoE OLT 510 may maintain responsibility for encrypting/decrypting messages across the optical domain. The FCU 512 may receive encrypted messages from the DPoE OLT 510, decrypt the messages, re-encrypt them for the electrical domain, and forward them to the CNU 514, and vice versa.

In the embodiment of method 500, at step 520 the FCU 512 may receive an encrypted FCU OAM message containing a multicast key from the DPoE OLT 510 via an ODN 502. The encrypted FCU OAM message of step 520 may be addressed to the FCU 512. In some embodiments, the FCU 512 may send an acknowledgment (Ack) OAM message to the DPoE OLT 510 at step 522. At step 524, the FCU 512 may also receive an encrypted CNU OAM message containing the multicast key from the DPoE OLT 510. The encrypted CNU OAM message of step 524 may be addressed to the CNU 514. The FCU 512 may then relay the encrypted CNU OAM message to the CNU 514 via a coaxial network or EDN 504 at step 526. In some embodiments, the FCU 512 may then receive an acknowledgment OAM message from the CNU 514 at step 528. At step 530, the FCU 512 may relay the acknowledgment OAM message to the DPoE OLT 510. The FCU 512 may employ the multicast key for decrypting multicast data received from the DPoE OLT 510 via the ODN 502 and encrypting multicast data transmitted to the CNU 514 via the EDN 504. In the embodiment of FIG. 5, one multicast key (mKey) may be employed for both the ODN 502 and the EDN 504 and may be transmitted to the FCU 512 and the CNU 514 in different OAM messages.

Figure 6:
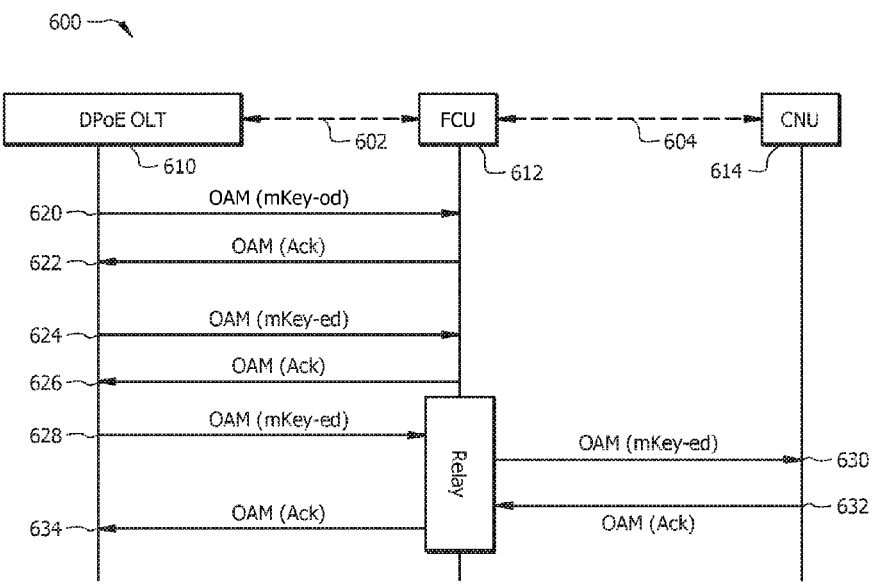
FIG. 6 is a diagram of another exemplary embodiment of a method of multicast key management for the first CNU in a multicast group.

FIG. 6 illustrates another exemplary embodiment of a method 600 of managing the exchange of multicast key(s) for a first CNU to join the multicast group, and establishing security over the multicast group. In some embodiments, the DPoE OLT 610, FCU 612, and CNU 614 of FIG. 6 may be similar to those described in FIGS. 1, 2, and 3. In the embodiment of FIG. 6, at step 620 the DPoE OLT 610 may send a first encrypted FCU OAM message containing an optical domain multicast key to the FCU 612 via an ODN 602. The optical domain multicast key (mKey-od) may be associated with encryption in an optical domain associated with the ODN 602. In some embodiments, at step 622, the DPoE OLT 610 may receive an acknowledgment OAM message from the FCU 612. At step 624, the DPoE OLT 610 may also send a second encrypted FCU OAM message containing an electrical domain multicast key (mKey-ed) to the FCU 612. The first encrypted FCU OAM message of step 620 and the second encrypted FCU OAM message of step 624 may be addressed to the FCU 612. In some embodiments, at step 626, the DPoE OLT 610 may receive another acknowledgment OAM message from the FCU 612. At step 628, the DPoE OLT 610 may also send an encrypted CNU OAM message containing the electrical domain multicast key (mKey-ed) to the CNU 614 via the FCU 612 and a coaxial network or EDN 604. The electrical domain multicast key may be associated with encryption in an electrical domain associated with the EDN 604. The encrypted CNU OAM message of step 628 may be addressed to the CNU 614. In the embodiment of method 600, at step 630, the encrypted CNU OAM message of step 628 may be relayed by the FCU 612 to the CNU 614 as an OAM message. In some embodiments, at step 632, the DPoE OLT 610 may receive an acknowledgment OAM message from the CNU 614. At step 634, the acknowledgment OAM message may be relayed by the FCU 612 to the DPoE OLT 610. In contrast with method 500, method 600 may support transmission of two separate multicast keys to the FCU 612 and CNU 614 to allow separate management of security in the ODN 602 and EDN 604.

Figure 7:
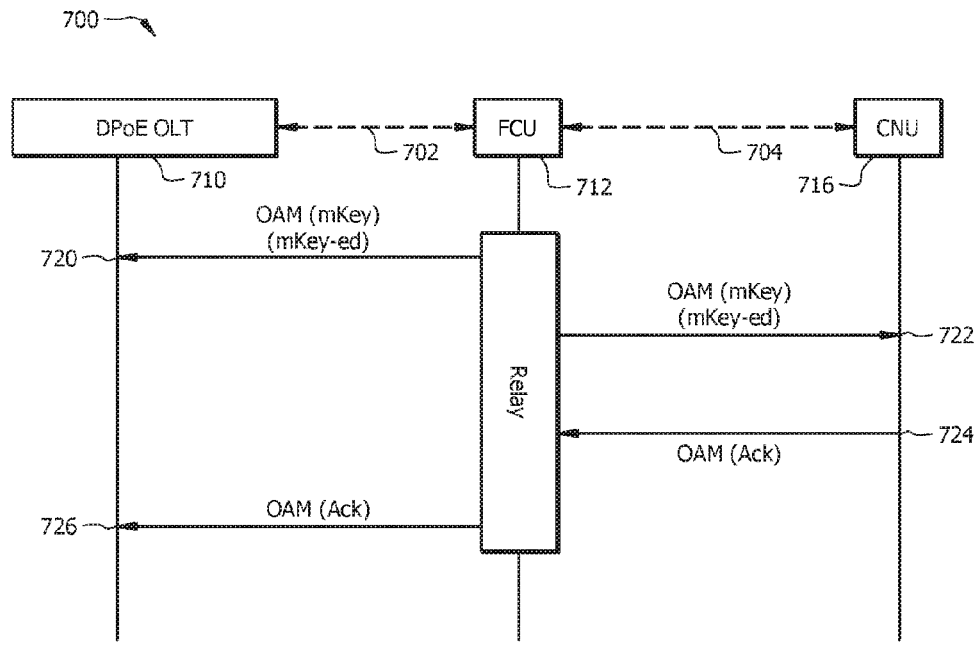
FIG. 7 is a diagram of an exemplary embodiment of a method of multicast key management for subsequent CNUs in a multicast group.

FIG. 7 illustrates an exemplary embodiment of a method 700 for managing the exchange of multicast key(s) for a second (or any number of subsequent) CNU(s) 716 to join the multicast group, and establishing security over the multicast group. In some embodiments, the DPoE OLT 710, the FCU 712, and the CNU 716 of FIG. 7 may be similar to those described in FIGS. 1, 2 and 3. The second CNU 716 may request to join a multicast group when the FCU 712 has already joined the multicast group on behalf of at least one other CNU that has been previously added to the multicast group. Accordingly, the FCU 712 may have already been configured with a multicast key for the multicast group, but the CNU 716 may not have been configured with the multicast key. At step 720, the FCU 712 may receive an encrypted CNU OAM message containing the multicast key from the DPoE OLT 710. The encrypted CNU OAM message of step 720 may be addressed to the CNU 716. At step 722, the FCU 712 may then relay the encrypted CNU OAM message to the CNU 716 via a coaxial network or EDN 704. In some embodiments, at step 724, the FCU 712 may then receive an acknowledgment OAM message from the CNU 716. At step 726, the FCU 712 may relay the acknowledgment OAM message to the DPoE OLT 710. The FCU 712 may employ the multicast key (mKey) for decrypting multicast data received from the DPoE OLT 710 via the ODN 702 and encrypting multicast data transmitted to the CNU 716 via the EDN 704. In the embodiment of FIG. 7, one multicast key (mKey) may be employed for both the ODN 702 and the EDN 704. In method 700, the FCU 712 may not receive an additional copy of the key, as the FCU may have been configured with the key when the first CNU joined the multicast group.

In an alternative embodiment of FIG. 7, the multicast key (mKey) communicated to the second CNU 716 may comprise an electrical domain multicast key (mKey-ed). At step 720, the DPoE OLT 710 may send an encrypted CNU OAM message containing the electrical domain multicast key (mKey-ed) to the CNU 716 via the FCU 712 and an EDN 704, wherein the electrical domain multicast key is associated with encryption in an electrical domain associated with the EDN 704. The encrypted CNU OAM message of step 720 may be addressed to the CNU 716. In the embodiment of method 700, at step 722, the encrypted CNU OAM message of step 720 may be relayed by the FCU 712 to the CNU 716 as an OAM message. At step 724, the DPoE OLT 710 may receive an acknowledgment OAM message from the CNU 716, and at step 726 the acknowledgment OAM message may be relayed by the FCU 712 to the DPoE OLT 710.

Figure 8:
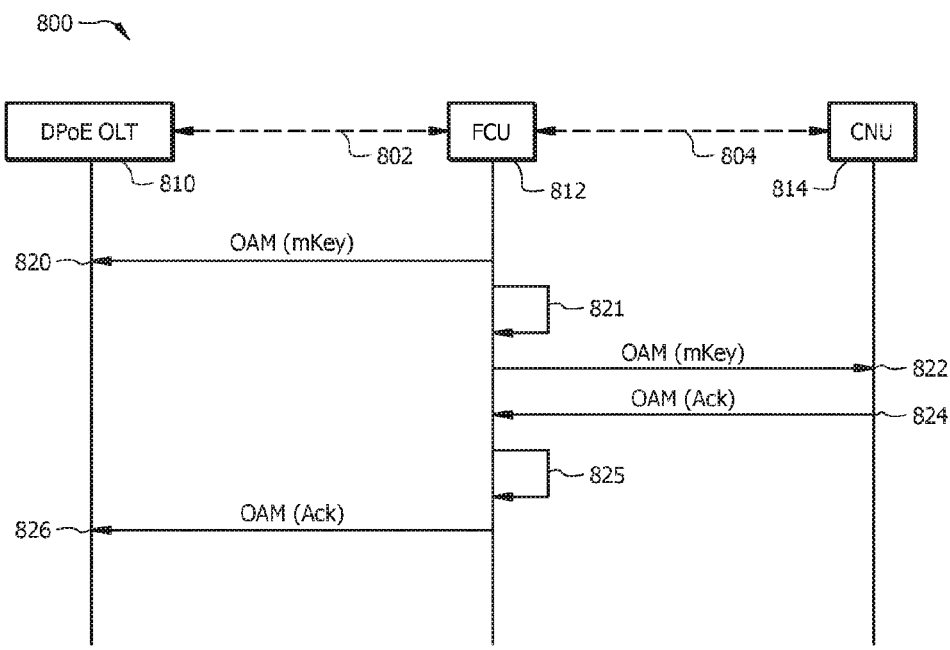
FIG. 8 is a diagram of another exemplary embodiment of a method of multicast key management for the first CNU in a multicast group.

FIG. 8 illustrates another exemplary embodiment of a method 800 of managing the exchange of multicast key(s) for a first CNU 814 to join the multicast group, and establishing security over the multicast group. In some embodiments, the DPoE OLT 810, the FCU 812, and the CNU 814 of FIG. 8 may be similar to those described in FIGS. 1, 2 and 3. In some embodiments, the FCU 812 may operate in bridge mode, similar to the FCU 512 of FIG. 5. In the embodiment of FIG. 8, at step 820 the FCU 812 may receive an encrypted CNU OAM message containing a multicast key (mKey) from a DPoE OLT 810 via an ODN 802. The OAM message of step 820 may be addressed to a CNU 814. At step 821, the FCU 812 may decrypt the encrypted CNU OAM message by snooping to read and store the multicast key. In some embodiments, one or more CNU unicast keys may be stored in the memory of the FCU 812, wherein each CNU unicast key is associated with a specific CNU. The FCU 812 may encrypt the OAM message with a CNU unicast key for a specific CNU 814. Then, at step 822, the FCU 812 may send the encrypted CNU OAM message to the CNU 814 via a coaxial network or EDN 804. At step 824, the FCU 812 may receive an acknowledgment OAM message from the CNU 814. At step 825, the FCU 812 may snoop the acknowledgment OAM message of step 824 to read and store acknowledgment OAM message information. Then, at step 826, the FCU 812 may relay the acknowledgment OAM message from the CNU 814 to the DPoE OLT 810. The FCU 812 may employ the multicast key (mKey) to decrypt multicast data received from the DPoE OLT 810 via the ODN 802 and encrypt multicast data transmitted to the CNU 814 via the EDN 804. In contrast with methods 500, 600 and 700 described above, method 800 may employ an FCU 812 with snooping functionality instead of relay functionality, which may allow the FCU 812 to be configured with a message to the CNU 814. By configuring the FCU 812 with a snooped message, the requirement of a separate OAM message to the FCU 812 may be eliminated.

Figure 9:
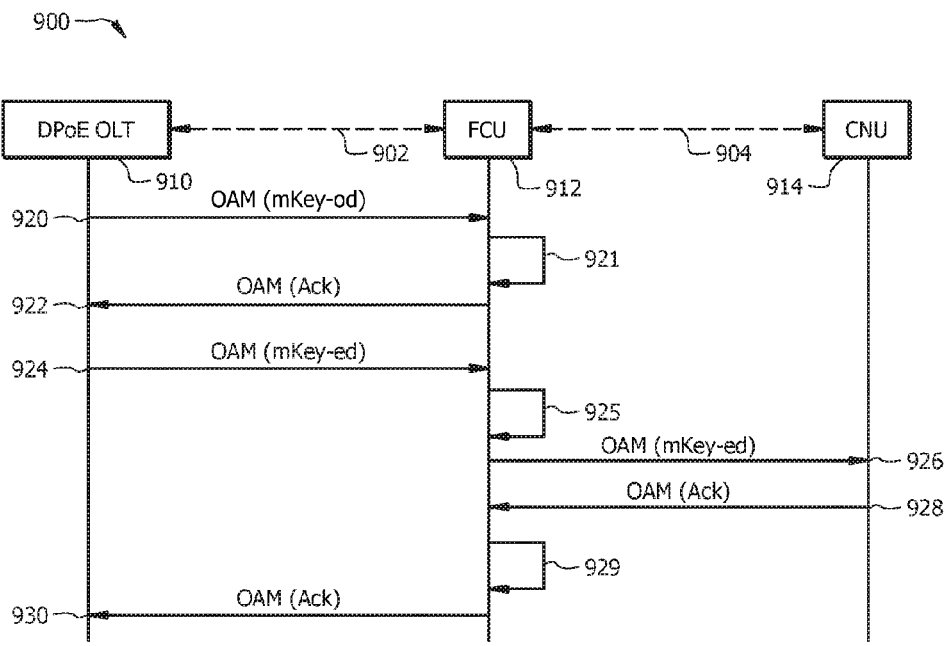
FIG. 9 is a diagram of yet another exemplary embodiment of a method of multicast key management for the first CNU in a multicast group.

FIG. 9 illustrates yet another exemplary embodiment of a method 900 of managing the exchange of multicast key(s) for a first CNU 914 to join the multicast group, and establishing security over the multicast group. In some embodiments, the DPoE OLT 910, FCU 912, and CNU 914 of FIG. 9 may be similar to those described in FIGS. 1, 2 and 3. In the embodiment of FIG. 9, at step 920, the FCU 912 may receive an encrypted FCU OAM message containing an optical domain multicast key (mKey-od) from a DPoE OLT 910, wherein the encrypted FCU OAM message of step 920 may be addressed to the FCU 912. At step 921, the FCU 912 may decrypt the encrypted FCU OAM message of step 920 to read and store the optical domain multicast key. At step 922, the FCU 912 may send an acknowledgment OAM message to the DPoE OLT 910. The FCU 912 may employ the optical domain multicast key (mKey-od) to decrypt multicast data received from the DPoE OLT 910.

Additionally, at step 924, the FCU 912 may receive an encrypted CNU OAM message containing an electrical domain multicast key (mKey-ed) from a DPoE OLT 910 via an ODN 902, wherein the OAM message of step 924 may be addressed to a CNU 914. At step 925, the FCU 912 may decrypt the encrypted CNU OAM message of step 924 by snooping to read and store the electrical domain multicast key. The FCU 912 may also encrypt the OAM message with a CNU unicast key for a specific CNU 914. At step 926, the FCU 912 may send the encrypted CNU OAM message to the CNU 914 via a coaxial network or EDN 904. At step 928, the FCU 912 may receive an acknowledgment OAM message from the CNU 914. At step 929, the FCU 912 may snoop the acknowledgment OAM message of step 928 to read and store acknowledgment OAM message information. At step 930, the FCU 912 may then relay the acknowledgment OAM message from the CNU 914 to the DPoE OLT 910. The FCU 912 may employ the electrical domain multicast key (mKey-ed) to encrypt multicast data transmitted to the CNU 914 via the EDN 904.

In some embodiments, the FCU 912 may receive the encrypted FCU OAM message of step 920 before the FCU 912 receives the encrypted CNU OAM message of step 924, wherein steps 920-922 occur before steps 924-930 (as shown in FIG. 9). In other embodiments, the FCU 912 may receive the encrypted CNU OAM message of step 924 before the FCU 912 receives the encrypted FCU OAM message of step 920, wherein at least some of steps 924-930 may occur before at least some of steps 920-922. In either case, the snooping functionality of FCU 912 may allow separate multicast keys to be used in the ODN 902 and EDN 904 and eliminate the requirement of a separate OAM message to configure the FCU 912 with the mKey-ed.

Figure 10:
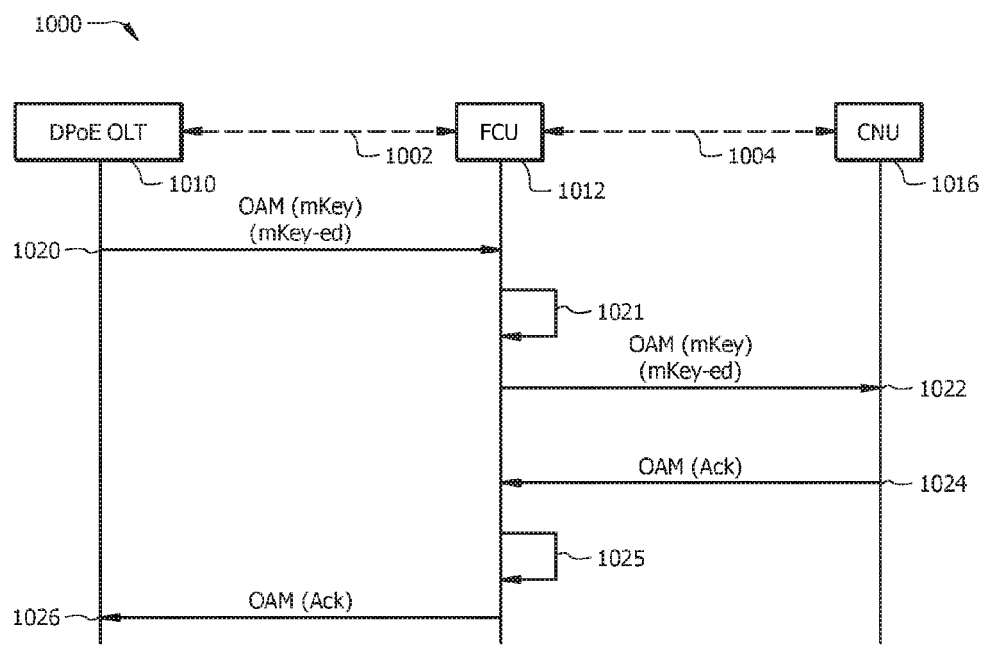
FIG. 10 is a diagram of another exemplary embodiment of a method of multicast key management for subsequent CNUs in a multicast group.

FIG. 10 illustrates an exemplary embodiment of a method 1000 for managing the exchange of multicast key(s) for a second (or any number of subsequent) CNU(s) 1016 to join the multicast group, and establishing security over the multicast group. In some embodiments, the DPoE OLT 1010, the FCU 1012, and the CNU 1016 of FIG. 10 may be similar to those described in FIGS. 1, 2 and 3. The second (or subsequent) CNU 1016 may request to join a multicast group wherein the FCU 1012 has already been established, and at least one CNU has been previously added to the multicast group. In some embodiments, the method 1000 described in FIG. 10 may continue from the methods 800 and 900 described in FIG. 8 or 9. For example, at step 1020, the FCU 1012 may receive a second encrypted CNU OAM message containing the electrical domain multicast key (mKey-ed) (or the multicast key (mKey)) from the DPoE OLT 1010 via an ODN 1002, wherein the OAM message of step 1020 may be addressed to the second CNU 1016. At step 1021, the FCU 1012 may decrypt the second encrypted CNU OAM message to read and store the multicast key. The FCU 1012 may then encrypt the OAM message with a second CNU unicast key specific for the second CNU 1016. At step 1022, the FCU 1012 may send the encrypted CNU OAM message to the second CNU 1016 via a coaxial network or EDN 1004. At step 1024, the FCU 1012 may receive an acknowledgment OAM message from the second CNU 1016. At step 1025, the FCU 1012 may snoop the acknowledgment OAM message of step 1024 to read and store acknowledgment OAM message information. At step 1026, the FCU 1012 may relay the acknowledgment OAM message from the second CNU 1016 to the DPoE OLT 1010. The FCU 1012 may employ the multicast key to encrypt multicast data transmitted to the second CNU 1016 via the EDN 1004. In method 1000, the FCU 1012 may not receive an additional copy of the optical domain multicast key, as the FCU 1012 may have been configured with the key when the first CNU joined the multicast group.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means ±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A fiber to coax unit (FCU) comprising:
   a transmitter;
   a receiver: and
   a processor coupled to the transmitter and the receiver and configured to cause the FCU to:
   receive an encrypted coaxial network unit (CNU) operations, administration and maintenance (OAM) message containing an electrical domain multicast key from an optical line terminal (OLT) via an optical network, wherein the OAM message is addressed to a CNU;
   decrypt the encrypted CNU OAM message to read and store the electrical domain multicast key;
   encrypt the OAM message with a CNU unicast key;
   send the encrypted CNU OAM message to the CNU via a coaxial network;
   receive an acknowledgment OAM message from the CNU;
   snoop the acknowledgment OAM message to read and store acknowledgment OAM message information;
   relay the acknowledgment OAM message from the CNU to the OLT; and employ the electrical domain multicast key to encrypt multicast data transmitted to the CNU via the coaxial network.

2. The FCU of claim 1, further comprising a memory coupled to the processor, wherein one or more CNU unicast keys, associated with one or more CNUs, is stored in the memory.

3. The FCU of claim 1, wherein the processor is further configured to cause the FCU to:
receive a second encrypted CNU OAM message containing the electrical domain multicast key from the OLT via an optical network, wherein the OAM message is addressed to a second CNU;
decrypt the second encrypted CNU OAM message to read and store the electrical domain multicast key;
encrypt the second OAM message with a second CNU unicast key;
send the second encrypted CNU OAM message to the second CNU via a coaxial network;
receive a second acknowledgment OAM message from the second CNU;
snoop the second acknowledgment OAM message to read and store second acknowledgment OAM message information;
relay the second acknowledgment OAM message from the second CNU to the OLT; and
employ the electrical domain multicast key to encrypt multicast data transmitted to the second CNU via the coaxial network.

4. The FCU of claim 1, wherein the FCU operates in bridge mode by maintaining separate security domains in an optical domain and an electrical domain.

5. The FCU of claim 1, wherein the processor further causes the FCU to:
receive an encrypted FCU OAM message containing an optical domain multicast key from the OLT, wherein the encrypted FCU OAM message is addressed to the FCU;
decrypt the encrypted ECU OAM message to read and store the optical domain multicast key in a memory;
send an acknowledgment FCU OAM message to the OLT; and
employ the optical domain multicast key to decrypt multicast data received from the OLT.

6. The FCU of claim 5, wherein the FCU receives the encrypted FCU OAM message before the FCU receives the encrypted CNU OAM message.

7. The FCU of claim 5, wherein the FCU receives the encrypted CNU OAM message before the FCU receives the encrypted FCU OAM message.

8. A method, comprising:
receiving, at a receiver of a fiber to coax unit (FCU), an encrypted coaxial network unit (CNU) operations, administration and maintenance (OAM) message containing an electrical domain multicast key from an optical line terminal (OLT) via an optical network, wherein the OAM message is addressed to a CNU;
decrypting, by a processor of the FCU, the encrypted CNU OAM message to read and store the electrical domain multicast key;
encrypting, by the processor, the OAM message with a CNU unicast key;
sending, by a transmitter of the FCU, the encrypted CNU OAM message to the CNU via a coaxial network;
receiving, by the receiver, an acknowledgment OAM message from the CNU;
snooping, by the processor, the acknowledgment OAM message to read and store acknowledgment OAM message information;
relaying, by the transmitter, the acknowledgment OAM message from the CNU to the OLT; and
employing, by the processor, the electrical domain multicast key to encrypt multicast data transmitted to the CNU via the coaxial network.

9. The method of claim 8, further comprising storing, in a memory coupled to the processor, one or more CNU unicast keys associated with one or more CNUs.

10. The method of claim 8, further comprising:
receiving a second encrypted CNU OAM message containing the electrical domain multicast key from the OLT via an optical network, wherein the OAM message is addressed to a second CNU;
decrypting the second encrypted CNU OAM message to read and store the electrical domain multicast key;
encrypting the second OAM message with a second CNU unicast key;
sending the second encrypted CNU OAM message to the second CNU via a coaxial network;
receiving a second acknowledgment OAM message from the second CNU;
snooping the second acknowledgment OAM message to read and store second acknowledgment OAM message information;
relaying the second acknowledgment OAM message from the second CNU to the OLT; and
employing the electrical domain multicast key to encrypt multicast data transmitted to the second CNU via the coaxial network.

11. The method of claim 8, wherein the FCU operates in bridge mode by maintaining separate security domains in an optical domain and an electrical domain.

12. The method of claim 8, further comprising:
receiving an encrypted FCU OAM message containing an optical domain multicast key from the OLT, wherein the encrypted FCU OAM message is addressed to the FCU;
decrypting the encrypted FCU OAM message to read and store the optical domain multicast key in a memory;
sending an acknowledgment FCU OAM message to the OLT; and
employing the optical domain multicast key to decrypt multicast data received from the OLT.

13. The method of claim 12, wherein the FCU receives the encrypted FCU OAM message before the FCU receives the encrypted CNU OAM message.

14. The method of claim 12, wherein the FCU receives the encrypted CNU OAM message before the FCU receives the encrypted FCU OAM message.

* * * * *